United States Patent
Dirneder et al.

(10) Patent No.: US 9,233,498 B2
(45) Date of Patent: Jan. 12, 2016

(54) CLOSING UNIT FOR AN INJECTION MOULDING MACHINE

(71) Applicant: ENGEL AUSTRIA GmbH, Schwertberg (AT)

(72) Inventors: Ing. Franz Dirneder, Schwertberg (AT); Johannes Mayr, Enns (AT)

(73) Assignee: ENGEL AUSTRIA GMBH, Schwertberg (AT)

(*) Notice: Subject to any disclaimer, the term of this patent is extended or adjusted under 35 U.S.C. 154(b) by 0 days.

(21) Appl. No.: 14/010,941

(22) Filed: Aug. 27, 2013

(65) Prior Publication Data

US 2014/0065258 A1    Mar. 6, 2014

(30) Foreign Application Priority Data

Sep. 3, 2012 (AT) ..................... 960/2012

(51) Int. Cl.
  *B29C 45/67* (2006.01)
  *B29C 45/66* (2006.01)

(52) U.S. Cl.
  CPC ............... *B29C 45/67* (2013.01); *B29C 45/66* (2013.01); *B29C 45/6707* (2013.01); *B29C 45/6728* (2013.01); *B29C 2045/664* (2013.01)

(58) Field of Classification Search
  CPC ............ B29C 45/6707; B29C 45/6721; B29C 45/6728; B29C 2045/688
  USPC ................................ 425/595, 451.9
  See application file for complete search history.

(56) References Cited

U.S. PATENT DOCUMENTS

| 3,729,283 | A  * | 4/1973 | Eggenberger et al. ........ 425/595 |
| 6,733,275 | B2 * | 5/2004 | Fujita ............................. 425/595 |
| 6,893,250 | B2 * | 5/2005 | Meschia et al. ............... 425/595 |
| 7,404,920 | B2 * | 7/2008 | Nogueira ....................... 425/595 |
| 7,484,954 | B2 * | 2/2009 | Kestle et al. .................. 425/595 |
| 7,566,214 | B2 * | 7/2009 | Koike et al. ................... 425/595 |
| 7,993,129 | B2 * | 8/2011 | Chiang ......................... 425/595 |

(Continued)

FOREIGN PATENT DOCUMENTS

| AT | 412 625 | 5/2005 |
| CN | 1374183 | 10/2002 |

(Continued)

OTHER PUBLICATIONS

Austrian Patent Office Search Report (ASR) issued Mar. 22, 2013 in Austrian Patent Application No. A 960/2012.

(Continued)

*Primary Examiner* — James Mackey
(74) *Attorney, Agent, or Firm* — Wenderoth, Lind & Ponack, L.L.P.

(57) ABSTRACT

A closing unit of an injection molding machine includes a moveable mold mounting plate and a fixed mold mounting plate, a hydraulic pressure mechanism for building up a closing pressure, at least one column provided with an external profile, and at least one two-part nut which is provided with an internal profile and the half members of which are coupled in motionally opposite relationship. The at least one column in the closed condition of the two-part nut is lockable by a positively locking relationship between the internal profile and the external profile relative to the moveable mold mounting plate or relative to the pressure mechanism. There is also provided an electric drive for opening and closing the two-part nut.

11 Claims, 4 Drawing Sheets

(56) References Cited

U.S. PATENT DOCUMENTS

2002/0127296 A1  9/2002  Fujita
2010/0173039 A1  7/2010  Chiang

FOREIGN PATENT DOCUMENTS

| | | |
|---|---|---|
| CN | 101332662 | 12/2008 |
| DE | 102 46 730 | 5/2003 |
| DE | 103 08 303 | 10/2003 |
| DE | 602 01 198 | 9/2005 |
| DE | 10 2007 012 057 | 9/2007 |
| DE | 10 2012 000 741 | 7/2012 |
| DE | 10 2011 014 783 | 9/2012 |
| EP | 1 238 777 | 9/2002 |
| JP | 2002-225100 | 8/2002 |

OTHER PUBLICATIONS

Chinese Search Report (SR) issued May 6, 2015 in Chinese Patent Application No. 201310390896.4.

* cited by examiner

CLOSING UNIT FOR AN INJECTION MOULDING MACHINE

BACKGROUND OF THE INVENTION

The invention concerns a closing unit of an injection molding machine. An injection molding process generally begins with closure of the closing unit, by the moveable mold mounting plate being moved towards the fixed mold mounting plate by a fast-action stroke device. The moveable mold mounting plate is then locked with the pressure-applying piston member of a pressure mechanism, and the pressure mechanism builds up the closing pressure necessary for the injection process.

Frequently, one or more columns are used for guiding the moveable mold mounting plate. In the case of an injection molding machine having one column, the pressure mechanism is often a hydraulic cylinder whose piston exerts a pressure on the moveable mold mounting plate via the column. An injection molding machine having four columns, then also referred to as bars, is also a familiar structure. Here, the pressure mechanism is often in the form of a pressure cushion between the mold mounting plates or at the ends of the bars. Those pressure cushions are also often hydraulic as high pressures have to be built up in a relatively short time.

The subject-matter of the invention is closing units of injection molding machines. In these machines, after the working operation of the fast-action stroke, the columns are locked and the pressure mechanism is supported by way of the columns. In the foregoing examples, on the one hand the columns are locked to the piston member of the pressure mechanism, and on the other hand the bars are locked to the moveable mold mounting plate.

Locking actions of that kind are often implemented by two-part nuts which embrace the columns of the closing unit. That applies both in regard to closing units having one column and also closing units having four columns. To be able to easily open and close the two-part nut, it is advantageous for the halves of the nuts to be mechanically coupled in motionally opposite relationship to each other. Since, as in the above-described examples, the devices necessary for the hydraulic arrangement are often already present there, it is standard procedure in the state of the art to actuate both the fast-action stroke and also the two-part nuts hydraulically.

Disadvantages with hydraulic opening and closing of the nuts are a relatively long reaction time on the part of the hydraulic system and a lack of precise positional detection of the two-part nuts. This means that time is lost in each injection molding process. The hydraulic activation can lead to disturbances in operation or even to damage to the closing unit if the nut is not properly closed and consequently locking of the column is incomplete.

The aim of the invention is to provide a closing unit having a locking mechanism which does not suffer from the above-described disadvantages.

SUMMARY OF THE INVENTION

The above object is attained by a closing unit including an electric drive for opening and closing the half members of the nut.

Actuation and at the same time the above-mentioned coupling of the halves of the nut, which occurs in motionally opposite relationship, can be achieved in a mechanically particularly simple fashion by two eccentrics which are connected to the electric drive and to a respective half of the two-part nut.

In a further example, only one eccentric is connected to the electric drive and a half member of the two-part nut. In that case, the coupling of the half member of the nut, which is in a motionally opposite relationship, can be implemented by a rotatably mounted rocker connected at its ends to a respective half of the two-part nut. To avoid tilting of that rocker mechanism, there can preferably also be provided two such rockers.

To provide a compact structure, in a further embodiment of such a closing unit having a plurality of bars, two two-part nuts are opened and closed by an electric drive. In that respect, a linkage couples the opening and closing movements of the nuts.

BRIEF DESCRIPTION OF THE DRAWINGS

Further advantages and details of the invention will be apparent from the Figures and the accompanying specific description. In the drawings.

DETAILED DESCRIPTION OF THE INVENTION

Figure 1:
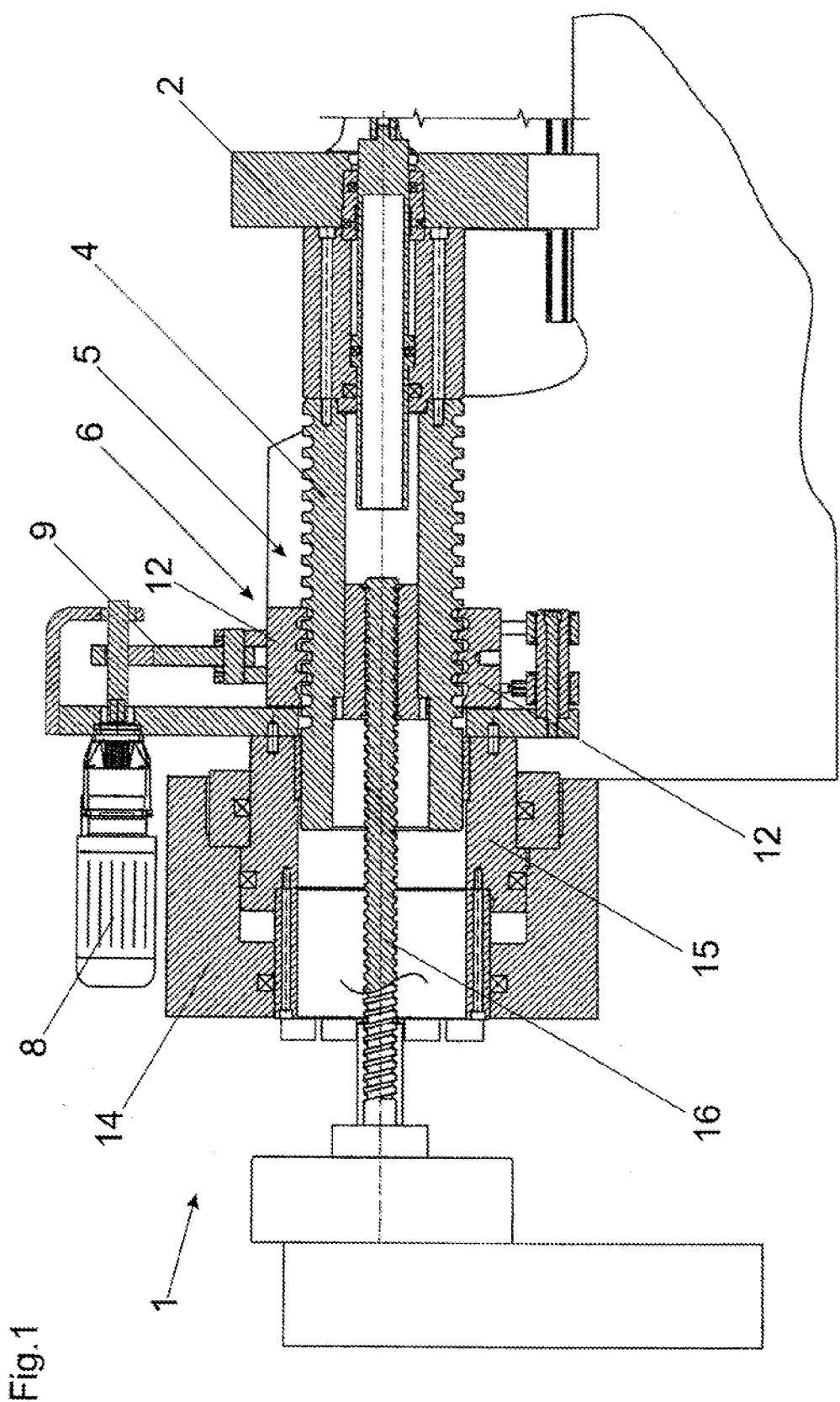
FIG. 1 is a cross-sectional view of a part of a closing unit according to the invention with one column.

FIG. 1 shows a sectional view through the part of a closing unit 1 with one column 4, which has the pressure mechanism 14 and the moveable mold mounting plate 2. The internal profile 7 of the half members 12 of the two-part nut 6 (see also FIGS. 3a, 3b, 4a, and 4b) engages into the external profile 5 on the column 4. In that way, the piston member 15 of the hydraulic pressure mechanism 14 can apply pressure to the moveable mold mounting plate 2. It will further be seen that the electric drive 8 in this embodiment is fixed to the piston member 15 of the pressure mechanism 14 and actuates one half member 12 of the divided two-part nut 6 by way of an eccentric 9. In this embodiment, the fast-action device 16 is in the form of a spindle mechanism in the interior of the column 4.

Figure 2:
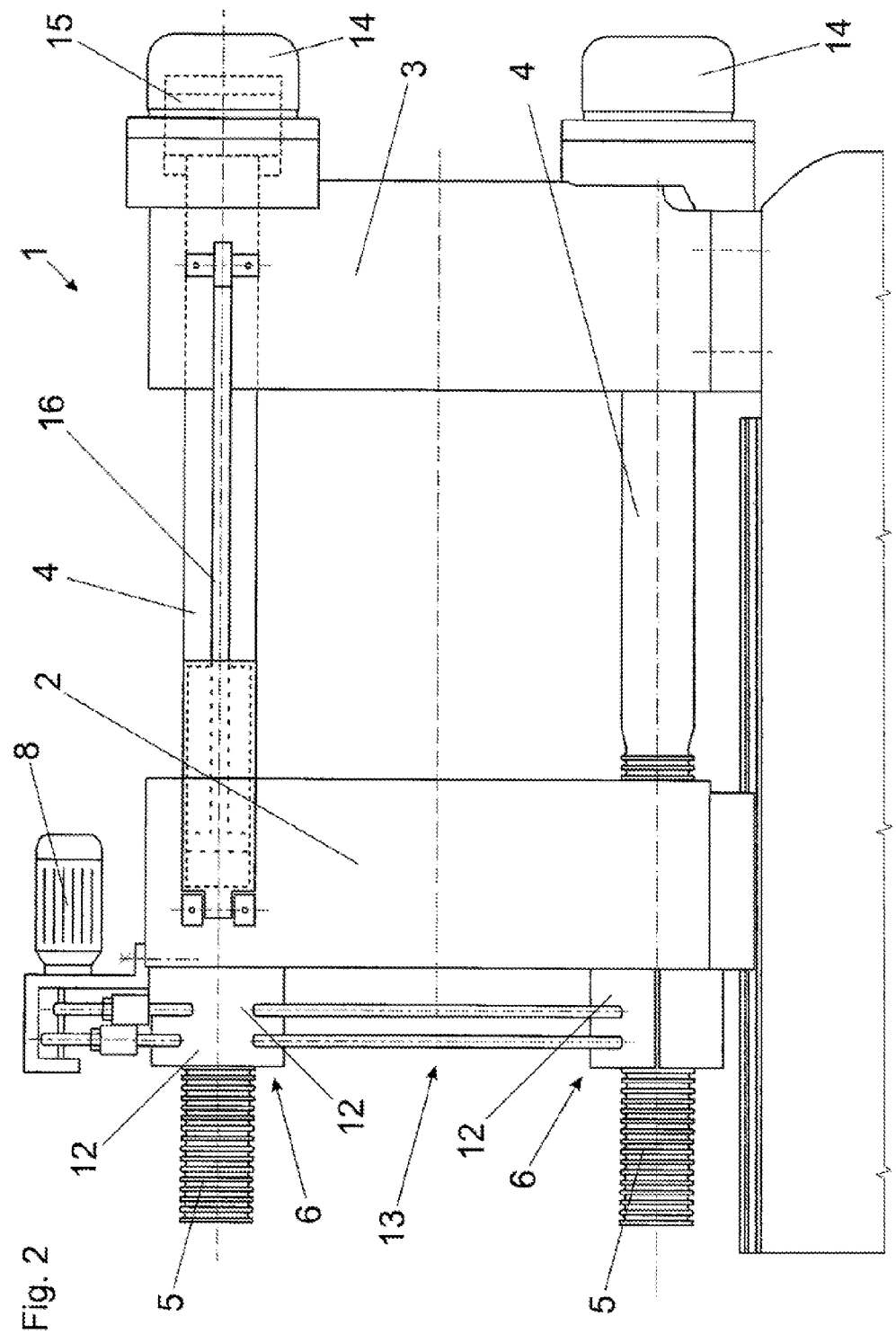
FIG. 2 is a diagrammatic side view of closing unit according to the invention with four columns.

FIG. 2 shows an embodiment of a closing unit 1 having four columns, in which opening and closing of the half members 12 of two nuts 6 is effected by an electric drive 8 fixed to the moveable mold mounting plate 2. Here, the linkage 13 couples the opening and closing movements of the two-part nuts 6. In addition, it is possible to see here the bars (columns) 4 with external profile 5, which pass through the moveable mold mounting plate 2. The fast-action stroke device 16 and the pressure mechanism 14 with the piston member 15 are also diagrammatically indicated. The implementation of such a pressure cushion is known to a person skilled in the art.

FIGS. 1 and 2 each admittedly show horizontally closing closing units. The invention, however, can also be used in vertical machines.

Figure 3A:
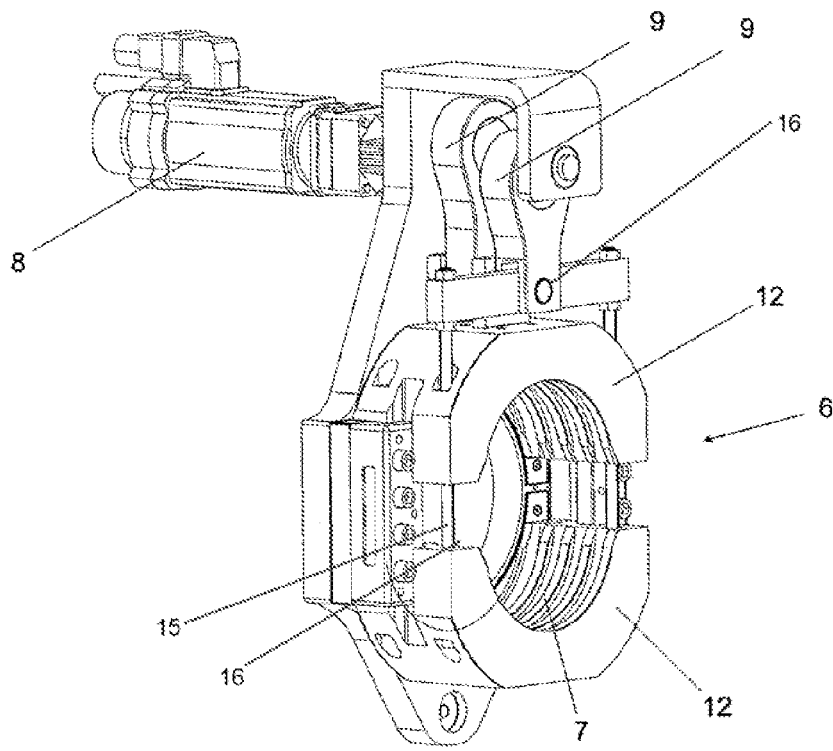
FIG. 3a shows an opened two-part nut with an electric drive, the halves of the nut being connected to the drive by way of two eccentrics.

The two-part nut 6 shown in FIG. 3a comprises two half members 12 which are each provided with an internal profile 7. It is also possible to see two eccentrics 9, each connected to a respective half member 12 by a respective connection element 15 at fixations 16. The electric drive 8 actuates the two half members 12 of the two-part nut 6 via the eccentrics 9, the connection elements 15, and the fixations 16.

Figure 3B:
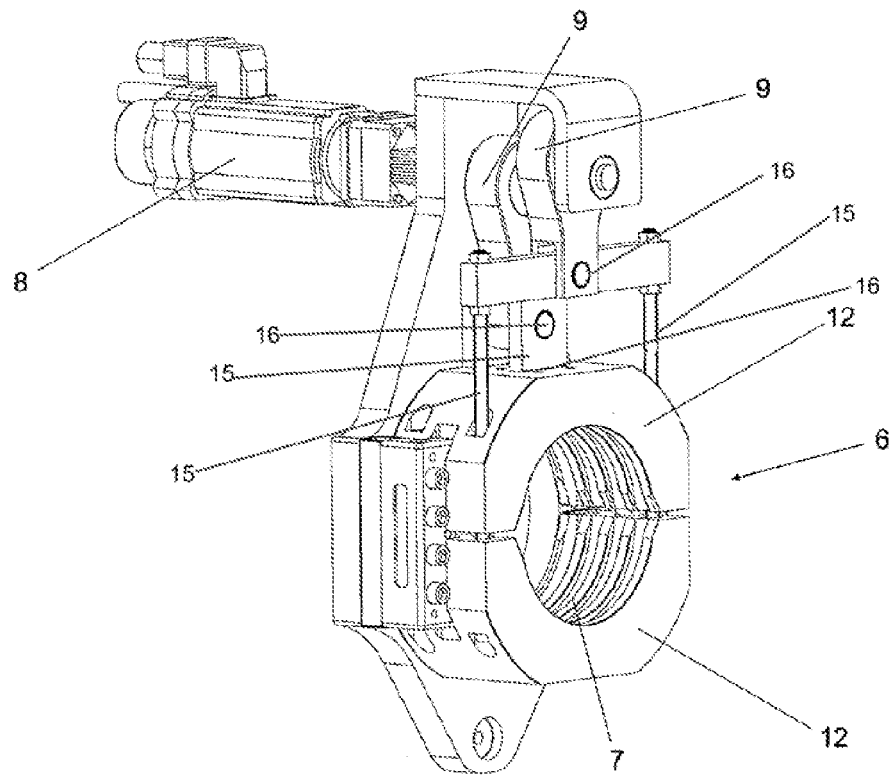
FIG. 3b shows the two-part nut from FIG. 3a in the closed condition.

FIG. 3*b* shows the same two-part nut 6 but in the closed condition.

Figure 4A:
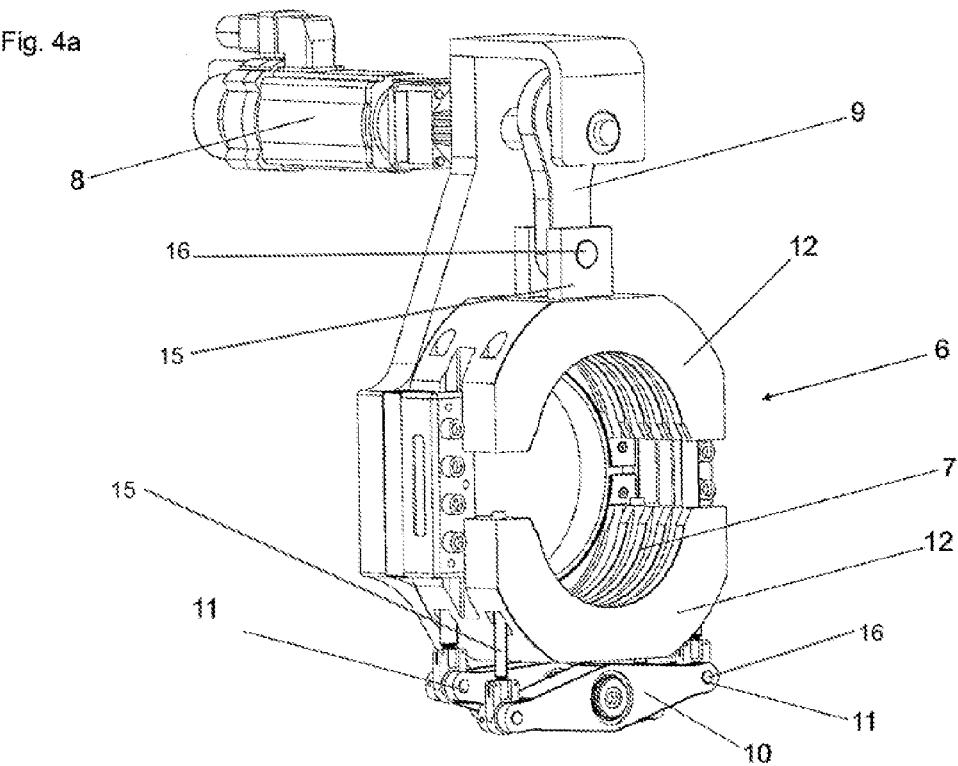
FIG. 4a shows an open two-part nut with an electric drive, wherein only one half is connected to the drive by way of an eccentric and coupling of the halves in motionally opposite relationship is achieved by two rocker mechanisms.

FIG. 4*a* shows a further embodiment with only one eccentric 9. Coupling of the two half members 12 of the two-part nut 6, which are in motionally opposite relationship, is effected here by the two rotatably mounted rockers 10, the ends 11 of which are fixed to a respective one of the half members 12 of the divided nut 6 via fixations 16 and connection elements 15.

Figure 4B:
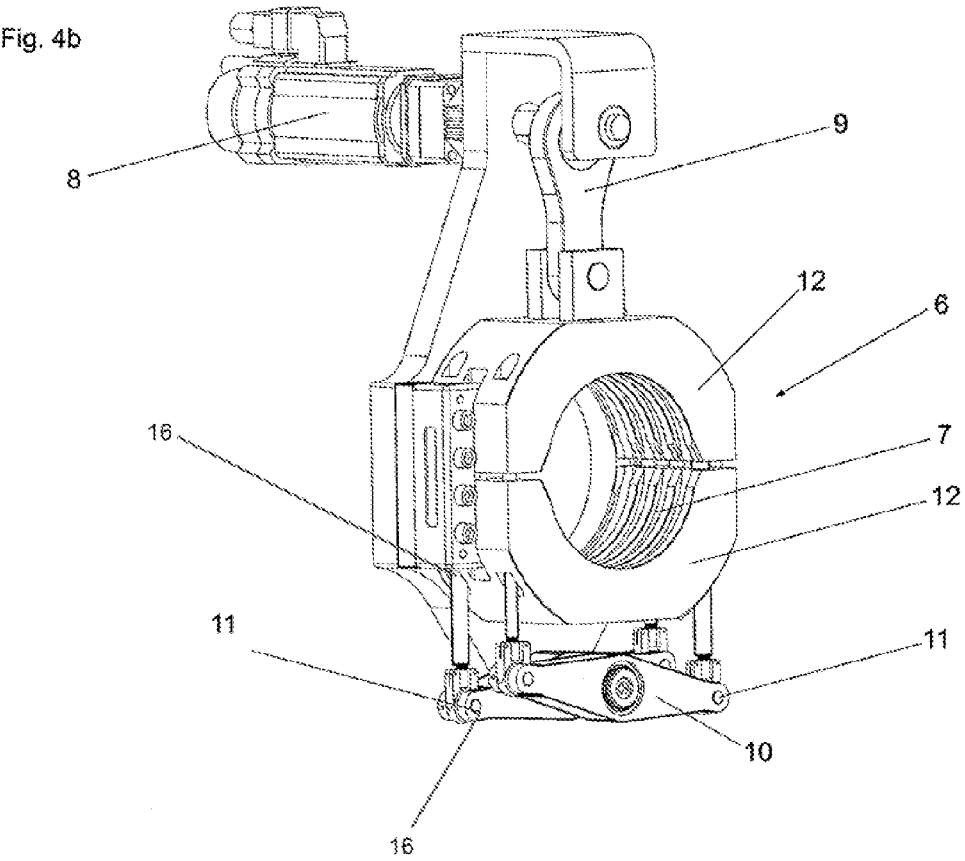
FIG. 4b shows the two-part nut of FIG. 4a in the closed condition.

FIG. 4*b* shows the divided nut from FIG. 4*a* in the closed condition.

The invention claimed is:

1. A closing unit of an injection molding machine, said closing unit comprising:
    a moveable mold mounting plate; and
    a fixed mold mounting plate;
    a hydraulic pressure mechanism for building up a closing pressure for closing said moveable mold mounting plate;
    a column having an external profile;
    a two-part nut having an internal profile, said two-part nut comprising two half members coupled in a motionally opposite relationship, said column being configured to be lockable relative to said pressure mechanism by a positive locking relationship between said internal profile of said two-part nut and said external profile of said column in a closed condition of said two-part nut;
    an electric drive for opening and closing said two-part nut;
    two eccentrics each connected to said electric drive and to a respective one of said half members of said two-part nut;
    a first connection element connected to a first one of said two eccentrics by a first fixation, and connected to a first one of said two half members by a second fixation; and
    a second connection element connected to a second one of said two eccentrics by a third fixation and connected to a second one of said two half members by a fourth fixation.

2. The closing unit as set forth in claim 1, wherein each of said first connection element and said second connection element is a rod.

3. The closing unit as set forth in claim 1, wherein said first connection element is configured to extend through and guide said second one of said two half members of said two-part nut not connected to said first connection element.

4. The closing unit as set forth in claim 1, wherein said column is fixed to said moveable mold mounting plate.

5. The closing unit as set forth in claim 1, wherein said column is the only column of said closing unit.

6. A closing unit of an injection molding machine, said closing unit comprising:
    a moveable mold mounting plate; and
    a fixed mold mounting plate;
    a hydraulic pressure mechanism for building up a closing pressure for closing said moveable mold mounting plate;
    a column having an external profile;
    a two-part nut having an internal profile, said two-part nut comprising two half members coupled in a motionally opposite relationship, said column being configured to be lockable relative to said pressure mechanism by a positive locking relationship between said internal profile of said two-part nut and said external profile of said column in a closed condition of said two-part nut;
    an electric drive for opening and closing said two-part nut;
    an eccentric connected to said electric drive and to a first one of said half members of said two-part nut;
    a rocker connected to a second one of said half members of said two-part nut;
    a first connection element connected to said eccentric by a first fixation, and connected to said first one of said two half members by a second fixation; and
    a second connection element connected to said rocker by a third fixation and connected to said second one of said two half members by a fourth fixation.

7. The closing unit as set forth in claim 6, wherein said eccentric is the only eccentric of said closing unit.

8. The closing unit as set forth in claim 6, wherein said rocker comprises one of two rotatably mounted rockers each having two ends, each of said ends of each of said two rockers being connected to a respective one of said half members of said two-part nut.

9. The closing unit as set forth in claim 6, wherein each of said first connection element and said second connection element is a rod.

10. The closing unit as set forth in claim 6, wherein said column is fixed to said moveable mold mounting plate.

11. The closing unit as set forth in claim 6, wherein said column is the only column of said closing unit.

* * * * *